United States Patent
Jung et al.

(10) Patent No.: US 12,296,611 B2
(45) Date of Patent: May 13, 2025

(54) RECORDING MEDIUM FOR NAIL STICKER AND METHOD FOR MANUFACTURING SAME

(71) Applicant: DS GLOBAL, Seoul (KR)

(72) Inventors: Gu Berm Jung, Seoul (KR); Dong Su Nam, Seoul (KR); Sun Kyun Lee, Seoul (KR); Seong Bok Yoon, Seoul (KR)

(73) Assignee: DS GLOBAL, Seoul (KR)

( * ) Notice: Subject to any disclaimer, the term of this patent is extended or adjusted under 35 U.S.C. 154(b) by 369 days.

(21) Appl. No.: 17/777,129

(22) PCT Filed: Dec. 12, 2019

(86) PCT No.: PCT/KR2019/017538
§ 371 (c)(1),
(2) Date: Oct. 11, 2022

(87) PCT Pub. No.: WO2021/100962
PCT Pub. Date: May 27, 2021

(65) Prior Publication Data
US 2023/0046989 A1    Feb. 16, 2023

(30) Foreign Application Priority Data

Nov. 19, 2019   (KR) .......................... 10-2019-0148753
Nov. 19, 2019   (KR) .......................... 10-2019-0148754
(Continued)

(51) Int. Cl.
*B41M 5/52*    (2006.01)
*B41M 5/382*   (2006.01)
*B41M 5/385*   (2006.01)

(52) U.S. Cl.
CPC ........ *B41M 5/385* (2013.01); *B41M 5/38228* (2013.01); *B41M 5/52* (2013.01)

(58) Field of Classification Search
CPC .... B41M 5/385; B41M 5/38228; B41M 5/52; B41M 5/504; B41M 5/506; B41M 5/508
(Continued)

(56) References Cited

U.S. PATENT DOCUMENTS 6,096,469 A * 8/2000 Anderson ................ B41M 5/52
427/256
6,159,581 A * 12/2000 Yoneda .................. B41M 5/506
428/199
(Continued)

FOREIGN PATENT DOCUMENTS

JP    3197611 U     5/2015
JP    2017097018 A  6/2017
(Continued)

OTHER PUBLICATIONS

International Search Report - PCT/KR2019/017538 dated Aug. 18, 2020.

*Primary Examiner* — Betelhem Shewareged
(74) *Attorney, Agent, or Firm* — CANTOR COLBURN LLP (57) ABSTRACT

Provided is a recording medium for a nail sticker and a method of manufacturing the same, and more particularly, to a recording medium and a method of manufacturing the same, which show that an ink reception layer is formed on a base of a polyurethane material so that a nail sticker can be printed using a sublimation printer. The recording medium for a nail sticker comprises: a release paper; an adhesion layer formed on the release paper; a base of a polyurethane material attached onto the adhesion layer; an undercoating layer formed on the base; and an ink reception layer formed on the undercoating layer.

10 Claims, 4 Drawing Sheets (30) Foreign Application Priority Data

Nov. 19, 2019 (KR) .......................... 10-2019-0148755
Nov. 19, 2019 (KR) .......................... 10-2019-0148756
Nov. 20, 2019 (KR) .......................... 10-2019-0149613

(58) Field of Classification Search
USPC ........................................................ 428/32.1
See application file for complete search history.

(56) References Cited

U.S. PATENT DOCUMENTS

| | | | |
|---|---|---|---|
| 2001/0009174 A1* | 7/2001 | Dinkel | B41M 5/52 |
| | | | 156/239 |
| 2004/0001135 A1* | 1/2004 | Soga | B41M 5/5227 |
| | | | 347/106 |
| 2007/0031463 A1* | 2/2007 | Fotinos | A01N 25/18 |
| | | | 424/443 |
| 2015/0173483 A1 | 6/2015 | Raouf et al. | |
| 2021/0229411 A1* | 7/2021 | Brown | B32B 29/002 |
| 2023/0046989 A1* | 2/2023 | Jung | B41M 5/385 |

FOREIGN PATENT DOCUMENTS

| | | |
|---|---|---|
| JP | 2017176426 A | 10/2017 |
| KR | 20050050496 A | 5/2005 |
| KR | 20130015029 | 2/2013 |
| KR | 20180015022 A | 2/2018 |
| KR | 20180137680 | 12/2018 |
| KR | 20190015448 | 2/2019 |
| KR | 20190091056 | 8/2019 |
| KR | 20200015143 | 2/2020 |

* cited by examiner

RECORDING MEDIUM FOR NAIL STICKER AND METHOD FOR MANUFACTURING SAME

TECHNICAL FIELD

The present invention relates to a recording medium for a nail sticker and a method of manufacturing the same, and more particularly, to a recording medium and a method of manufacturing the same, which show that an ink reception layer is formed on a base of a polyurethane material so that a nail sticker can be printed using a sublimation printer.

BACKGROUND ART

In general, a nail art means expressing a nail or a toenail beautifully and is a synthetic concept that means realizing artistic expressions on nails as well as simply polishing nails, and it is representative to draw a picture on a long nail or attach beads, a jewel, and so on to a long nail.

Recently, domestic beauty and nail art industries have grown quickly, a scale of the nail art industry has been estimated at about one trillion won in the beauty market whose scale has been estimated at about four trillion won, and it is expected that the scale will tend to increase continuously for some time.

Furthermore, among decoration materials used in the nail art, there is a "nail sticker" that is conveniently available, and this nail sticker is configured in a form that a design is printed on one surface, and an adhesive is coated on another one surface, thereby showing a beauty effect in such a manner as to attach the sticker onto a user's nail.

Figure 1:
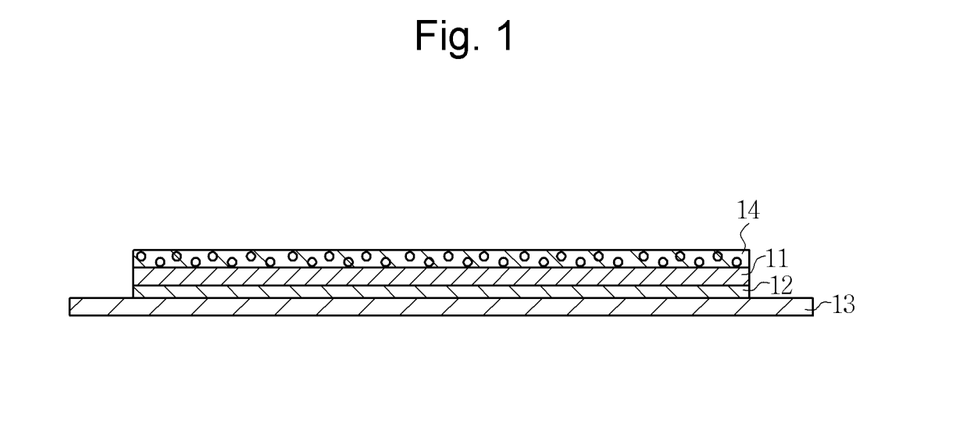
FIG. 1 represents a conventional nail sticker.

FIG. 1 exemplifies a general nail sticker, and referring to this, the nail sticker comprises a base layer 11; an adhesive layer 12 coated and formed on a bottom surface of the base layer 11; a release paper 13 detachably attached to a bottom surface of the adhesive layer 12; and a decoration layer 14 formed in such a manner as to print a top surface of the aforesaid base layer 11 through silk screen printing with a glitter mix into which epoxy and glitter are mixed. The base layer is composed of a material having elasticity and flexibility because the sticker should be attached to a nail and so on having bending. The base layer is formed using a material having elasticity and flexibility because it has to be attached to a nail having bending and so on.

Meanwhile, among printers which form images, there is a thermal transfer printer that is configured in such a manner that heat is applied to a thermal transfer ribbon coated with dyes so that the dyes of the thermal transfer ribbon are transferred to a recording medium to thereby be fixed.

According to a thermal transfer method of the dyes, the thermal transfer printer is divided into a sublimation-type thermal transfer method in which dyes are transferred while being sublimated, and a melting type thermal transfer method in which a dye or pigment layer is transferred while melting due to a thermal recording head.

This thermal transfer printer is an important means of a photo printer along with an inkjet printing method, and the area of its use has been generalized from the field of manufacture of an identification card or a camera to the field of printing of images expressed electrically using a printer.

Since this thermal transfer printer, particularly, a sublimation printer has a small size, it is suitable for a personal or portable form.

Accordingly, it is not impossible for a user to manufacture a nail sticker using a sublimation printer at home to suit his or her personal taste. However, in order to manufacture a nail sticker using a sublimation printer, it is necessary to develop an exclusive recording medium.

Printing paper or sticker paper is mainly used in a recording medium of the sublimation printer. The printing paper comprises sublimation dyes and an ink reception layer having a good commercial property on a base, and in case of the sticker paper, an adhesion layer is further included on an opposite surface of the base. At this time, the base used is made from void polyethylene terephthalate (PET) or polypropylene (PP) synthetic paper, and there is a limit in the material used because the base has largely an effect on printing fitness.

Furthermore, in the printing method of the sublimation printer, dyes are transferred to or coated on the recording medium in the order of steps Y (yellow)→M (magenta)→C (cyan)→O (Overlay), during this process, the recording medium is transferred through four or more reciprocating motions from the printer to back and forth, and an error in feeding occurs at the beginning of printing or during the reciprocating motions when stiffness of the recording medium is too poor. In case of the printing paper or the sticker paper, since a plastic film, such as polyethylene terephthalate (PET) or polypropylene (PP), having stiffness is basically used, no problem of the error in feeding occurs during printing.

However, in case of void PET or PP synthetic paper used in the base, since there are neither elasticity nor flexibility, it is problematic in that it is difficult to apply it to a recording medium for a gel nail sticker which should be attached to a nail having bending and so on.

DETAILED DESCRIPTION OF THE INVENTION

Technical Problem

The present invention has been devised for solving the aforesaid problems, and an object of the present invention is to provide a recording medium and a method of manufacturing the same, which show that an ink reception layer is formed on a base of a polyurethane material so that a nail sticker can be printed using a sublimation printer.

Another object of the present invention is to provide a recording medium and a method of manufacturing the same, which show that an ink reception layer formed on a base of a material having elasticity, such as polyurethane and so on, can evenly be transferred without deforming when the recording medium is transferred from a sublimation printer.

Solution for Solving the Problem

A recording medium for a nail sticker according to the present invention comprises: a release paper; an adhesion layer formed on the release paper; a base of a polyurethane material attached onto the adhesion layer; an undercoating layer formed on the base; and an ink reception layer formed on the undercoating layer.

Furthermore, in case that the base is formed of a transparent polyurethane material, it is preferable that a white layer is further formed between the adhesion layer and the base.

A method of manufacturing a recording medium for a nail sticker according to the present invention comprises: forming a base of a polyurethane material having a thickness of 50 μm or more; forming an adhesion layer on a lower surface of the base; forming an undercoating layer on an upper surface of the base, the undercoating layer being intended for reinforcing a solvent resistance property when an ink reception layer is coated; forming the ink reception layer having a thickness of 15 μm or more on an upper surface of the undercoating layer; attaching a release paper to a lower portion of the adhesion layer; and forming a back coating layer on a back surface of the release paper.

Effect of the Invention

The present invention can provide a recording medium in which an ink reception layer is formed on a base of a polyurethane material so that a nail sticker can be printed using a sublimation printer.

Furthermore, it is effective in that a transfer part to which a base and an ink reception layer are not attached is formed at each of both sides of a release paper so that the ink reception laser having elasticity can evenly be transferred without deforming when a recording medium is transferred from a sublimation printer.

BEST MODE FOR CARRYING OUT THE INVENTION

Hereinafter, the exemplary embodiment according to the present invention is concretely described with reference to the accompanying drawings.

Figure 2:
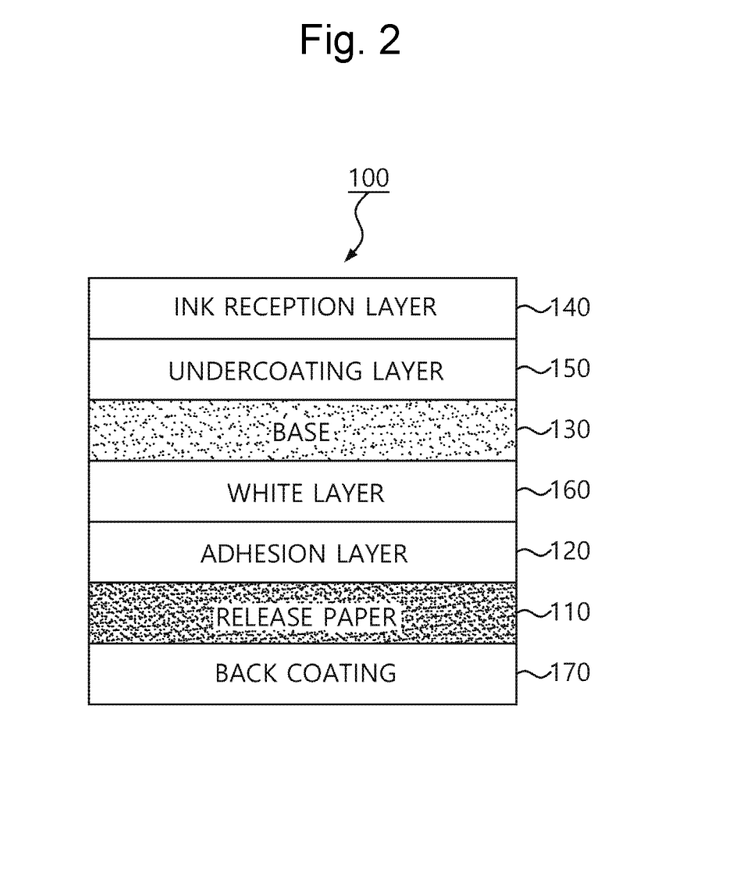
FIG. 2 and FIG. 3 represent an exemplary embodiment according to the present invention.
Figure 3:
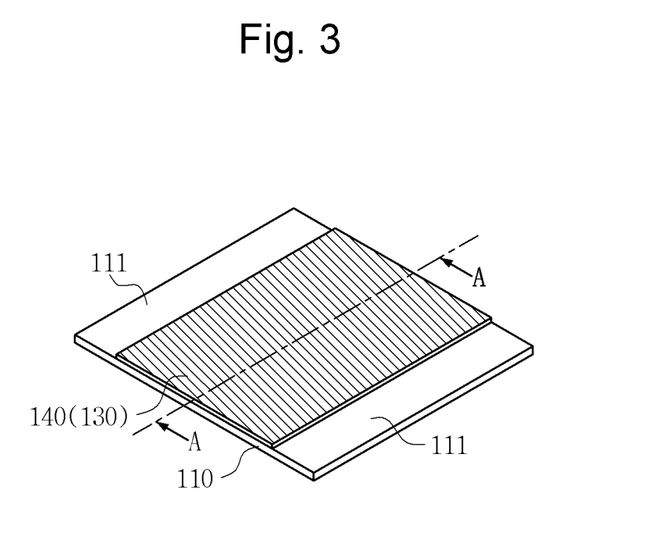

FIG. 2 is a cross-sectional view along line A-A shown in FIG. 3, and FIG. 3 is a perspective view showing an exemplary embodiment of the present invention. Referring to those, the exemplary embodiment 100 showing a recording medium according to the present invention comprises: a release paper 110; an adhesion layer 120; a base 130; and an ink reception layer 140.

The release paper is detachably attached to the adhesion layer, and a user uses a nail sticker in such a manner that he or she attaches the base to a nail or a toenail using adhesion strength of the adhesion layer after separating the release paper from the adhesion layer.

The release paper 110 is mainly made of a polyester material and is formed in a thickness of 75 to 125 μm.

In case that the thickness of the release paper 110 is less than 75 μm, it is problematic in that a feed roller is contaminated by the adhesion layer during printing, and in case that the thickness exceeds 125 μm, it is problematic in that a load on the feeding of a printer is generated, and the cost of production also rises because a total thickness increases.

The adhesion layer 120 is formed on a back surface of the base, and functions to attach the base 130 separated from the release paper 110 to a nail or a toenail.

The base 130 is a constituent element corresponding to a basic body of the nail sticker and is formed of a polyurethane material in the present exemplary embodiment.

Since the base 130 is formed of the polyurethane material, it has elasticity and flexibility so as to be attached to a nail or a toenail with bending.

In particular, the base 130 of the polyurethane material is formed to have a thickness of 50 to 200 μm.

In case that the thickness of the base 130 is less than 50 μm, it is problematic in that it is inconvenient for a user to handle the base, and the base is easily elastic, and in case that the thickness of the base 130 exceeds 200 μm, it is problematic in that a load on the feeding of a printer is generated, and the cost of production also rises because a height difference increases too much.

The ink reception layer 140 has a satisfactory chemical attraction with respect to dyes transferred from a thermal transfer ribbon and makes diffusion of the dyes occur well in a transfer process, and it is preferable to use a material having good preservability for the dyes after transferring.

Examples of this material include polyester resins, polyacrylate resins, polyvinyl acetate resins, polycarbonate resins, polyurethane resins, polyamide resins, polyvinyl chloride resins, vinyl chloride-vinyl acetate copolymers, other resins whose polarity has a large combination, and so on.

In order to improve release properties with these reins during transferring, polyethylene wax, silicone oil, and so on may be added to the ink reception layer 140, and a surfactant may also be used for diffusion of them.

In order to improve whiteness of the recording medium 100, a fluorescent dye for providing fluorescence, such as titanium dioxide, calcium carbonate, clay, zinc oxide, and so on, may also be added thereto. Furthermore, in order to increase a weather resistance property, an antioxidant or an ultraviolet ray absorbent may be introduced.

The ink reception layer 140 may be formed by being coated with a coating liquid containing a resin and an additive, if necessary, inorganic substance, then being dried.

It is appropriate that the ink reception layer 140 has a thickness of 15 to 30 μm, and it is preferable that a value of "the thickness of the ink reception layer and/or the thickness of the base" are more than 0.15.

It is preferable that, within a scope in which the value of the thickness of the ink reception layer and/or the thickness of the base are greater than 0.15, as the thickness of the base increases, the thickness of the ink reception layer also increases.

In case that the base 130 of a polyurethane material is used, when the thickness of the ink reception layer is less than 15 μm, it is impossible to satisfy sublimation printing fitness.

The reason why synthetic paper of a void polyethylene terephthalate (PET) or polypropylene (PP) material is used in the base of the sublimation printer is because the base has cushioning in some degree while having self-stiffness. Due to a characteristic of the sublimation printer, the ribbon and the recording medium meet at one point during printing and are pressured so as to come into close contact with each other at a location between a head and a platen roller, and at this time, if the base of the recording medium has excessive stiffness without cushioning, since the close contact between the ribbon and the recording medium will decrease, the transfer of dyes is insufficiently carried out, and due to this, deterioration in printability, such as a decline in optical density, and so on, occurs.

On the contrary, when the base has too good elasticity and flexibility like those of polyurethane, since it is not properly pressured, the transfer of dyes occurs unsatisfactorily, and a problem is also generated from reciprocating feeding.

In order to solve these problems, a portion of the ink reception layer which comes into contact with the ribbon is treated to be thicker than the existing thickness of 5 μm so that the portion in which deterioration is generated by the polyurethane base can be supplemented. As a result of carrying out various experiments, it was found that the problems could be solved by the ink reception layer having a thickness of 15 μm or more, and was also found that the ink reception layer was affected by the thickness of the polyurethane base. As mentioned previously, since binders used in the ink reception layer are mainly polymers having stiffness, the ink reception layer could be supplemented by only adjustment of its thickness.

Under the consideration of solubility, workability, and so on, alcohol, glycol ethers, ketone, toluene, dimethylformaldehyde, ethyl acetate, and so on may be used as a coating solvent of the ink reception layer 140. In the present invention, it is preferable to use ketone, toluene, dimethylformaldehyde, and so on.

An undercoating layer 150 is further formed between the base 130 and the ink reception layer 140. This is intended for reinforcing a solvent resistance property when the ink reception layer 140 is coated.

A conventional art shows that a base is formed of polyethylene terephthalate (PET) or polypropylene (PP), and since this base has some solvent resistance property with respect to a solvent, such as toluene or methyl ethyl ketone (MEK) of the ink reception layer and so on, it not almost affected by coating of the ink reception layer.

However, in case of polyurethane which is the base according to the present invention, since it is easily soluble in toluene or MEK according to its kind, the state in which the base melts due to the solvent of the ink reception layer when the ink reception layer is coated, or the base becomes uneven entirely due to the occurrence of swelling, and so on are generated. In order to prevent this, polyurethane having a solvent resistance property is used, or this problem can be solved in such a manner as to put the undercoating layer beneath the ink reception layer. When polyurethane having a solvent resistance property is used, since there is a limit to the selection of polyurethane, and introduction of the undercoating layer causes a rise in expenses, merits and demerits exist.

Since the undercoating layer 140 is coated with a coating liquid containing a high-gloss resin, the recording medium having excellent gloss can be manufactured regardless of a material of the base 130. The coating liquid used in the undercoating layer 140 may raise a light resistance property of the recording medium as vulnerability to light of the base containing a sunblock, an antioxidant and so on is improved.

In general, in order to increase whiteness of the recording medium, a whitening agent or a dye may be added to the ink reception layer 140. These become chief causes that yellowing of a printing part and a non-printing part occurs.

As this whitening agent or dye is added to the undercoating layer 140 rather than the ink reception layer, an effect on external circumstances can reduce, and thus a light resistance property can be improved.

Examples of resins which may be used in the undercoating layer 140 include polyol-based resins, polyurethane-based resins, acrylic-based resins, vinyl resins, and so on, and curing agents mainly based on polyisocyanate, aziridine, and so on are also used. These may be all used in a polyolefin-based film, a polyethylene terephthalate film, and so on, such as polypropylene, polyethylene, and so on, as well as polyurethane. All the coating methods may be applied to the undercoating layer, and for example, a bar or gravure coating method is generally used.

It is preferable that the undercoating layer 140 has a thickness of 3 to 5 μm.

In case that the thickness of the undercoating layer 140 is less than 3 μm, it is problematic in that no sufficient solvent resistance property is found, and in case that thickness exceeds 5 μm, it is problematic in that a total thickness increases and the cost of production rises.

MODE FOR CARRYING OUT THE INVENTION

In the exemplary embodiment according to the present invention, the base 130 may be a transparent polyurethane material.

In this case, it is preferable that a white layer 160 is formed between the adhesion layer 120 and the base 130.

Of course, in case that the base is opaque, for example, the base 130 is white polyurethane, the white layer 160 is unnecessary.

It is preferable that the white layer 160 has a thickness of 5 μm or below.

Furthermore, a back coating layer 170 is formed on a back surface of the release paper 110. The back coating layer 170 functions to securing a separation property between recording media during printing, a beautiful sight and so on, matte treatment, antistatic agent treatment, the provision of a releasing property and so on may be performed, and printing of a company's logo and so on may also be carried out additionally.

The back coating layer 170 may be formed of a polyurethane or acrylic material, if necessary, a pigment such as silica may be added thereto. It is preferable to have a thickness of 2 to 3 μm.

In case that the thickness of the back coating layer 170 is less than 2 μm, it is problematic in that separation between the recording media is not smoothly performed, and in case that the thickness exceeds 3 μm, it is problematic in that a total thickness increases and the cost of production rises.

Hereinafter, a method of manufacturing a recording medium for a nail sticker according to the present invention is described.

In the method of manufacturing a recording medium for a nail sticker according to the present invention, first, a base made of a polyurethane material and having a thickness of 50 μm or more is formed.

Next, an adhesion layer is formed on a lower surface of the base.

Next, an undercoating layer, which is intended for reinforcing a solvent resistance property when an ink reception layer is coated, is formed on an upper surface of the base.

Next, an ink reception layer having a thickness of 15 μm or more is formed on an upper surface of the undercoating layer.

Then, a release paper is attached to a lower portion of the adhesion layer, and a back coating layer is formed on a back surface of the release paper.

The present invention is described in detail below with reference to the examples according to the present invention. However, the present invention is not limited to the following examples.

Examples and Comparative Examples

With respect to a base of polyurethane (brand name: DSAL series, Two & Two Chemical in Korea) having several thicknesses, on one surface of which a transparent polyethylene terephthalate (PET) protection film of 50 μm was laminated, and on another surface of which the composition of the adhesion layer shown in [Table 1] below was dried using a baker applicator, then was coated to be ~40 μm thick so that the adhesion layer of a recording medium for a nail sticker could be formed, and thereafter while the protection film of 50 μm was removed, a PET release paper to be released of ~105 μm treated by an antistatic agent and matte back coating was laminated toward the adhesion layer.

The composition of the undercoating layer presented in [Table 2] was dried and was then coated on one surface of the polyurethane base of the recording medium manufactured as described above to be ~4 μm thick using a bar coater, and thereafter, the composition of the ink reception layer presented in [Table 3] was again dried and was then coated thereon using a bar coater to cause various thicknesses to have been formed, so a final recording medium for a nail sticker was completed.

TABLE 1

Composition of the Adhesion Layer

| Division | Compound | Input (part by weight) |
|---|---|---|
| solute | 2-ethylhexyl acrylate | 46.5 |
|  | acrylic acid | 3.3 |
|  | 2,2-azobisisobutyronitrile | 0.2 |
| solvent | ethylacetate | 50 |

Note)
Solvent Compound: Pure Chemical in Japan

TABLE 2

Composition of the Undercoating Layer

| Division | Compound | Input (part by weight) |
|---|---|---|
| solute | polyurethane dispersion (32%) [1] | 30.9 |
|  | aziridine cross-linking agent [2] | 0.1 |

TABLE 2-continued

Composition of the Undercoating Layer

| Division | Compound | Input (part by weight) |
|---|---|---|
|  | silicone additive (surfactant) [3] | 1 |
| solvent | water | 68 |

Note
[1] Polyurethane dispersion: HU-SM100, Handok Industry
Note
[2] Aziridine cross-linking agent: CL-467, BF Chemtech
Note
[3] Silicone additive: BYK-348, BYK Korea

TABLE 3

Composition of the Ink Reception Layer

| Division | Compound | Input (part by weight) |
|---|---|---|
| solute | vinyl chloride-vinyl acetate copolymer [1] | 19 |
|  | amino-denatured silicone oil [2] | 0.02 |
|  | epoxy-denatured silicone oil [3] | 0.02 |
|  | fluorine-based surfactant [4] | 0.06 |
| solvent | methyl ethyl ketone | 40 |
|  | toluene | 40 |

Note
[1] Vinyl chloride-vinyl acetate copolymer: CP-430, Hanwha Chemical
[2] Amino-denatured silicone oil: KF-393, Shin-Etsu Chemical in Japan
[3] Epoxy-denatured silicone oil: X-22-343, Shin-Etsu Chemical in Japan
[4] Fluorine-based surfactant: FC-4430, 3M in the USA

[Table 4] below shows the examples and comparative examples according to each thickness of polyurethane and each thickness of the ink reception layer.

TABLE 4

Record Medium for Nail Sticker (unit: μm)

Division of Layer

|  | Example 1 | Example 2 | Example 3 | Comparative Example 1 | Comparative Example 2 | Comparative Example 3 | Comparative Example 4 |
|---|---|---|---|---|---|---|---|
| Polyurethane base | 200 | 120 | 50 | 220 | 40 | 120 | 60 |
| Ink reception layer | 30 | 20 | 15 | 35 | 15 | 15 | 10 |

Experimental Method: Evaluation on Properties of the Recording Media for Nail Stickers Images of the recording media for nail stickers manufactured in said Examples 1 to 3 and Comparative Examples 1 to 4 were outputted using a thermal transfer photo printer (PC389P), a product made by LG Electronics Inc. in Korea. At this time, a wrinkle and stain, the quality of feeding (reciprocating), and optical density (OD) with respect to the images were evaluated, and the results thereof were arranged in [Table 5] below.

In [Table 5] below, the optical density was measured by a SpectroEye measurement instrument, a product made by X-Rite, Inc. in the USA after magenta and black images of 1 cm×1 cm were printed.

Furthermore, evaluation on the winkles and stains of the printed images was performed in such a manner as to confirm whether or not wrinkles or stains existed in the images with the naked eye when printing the images, and compare their sizes with each other. As a result thereof, the case in which there was neither wrinkle nor stain was indicated by "○", and the case in which the size is 0.3 cm or below was indicated by "Δ", and the case in which the size is 0.3 cm or more was indicated by "X".

Furthermore, evaluation on the quality of feeding was performed in such a manner as to confirm, with the naked eye, the occurrence or non-occurrence of errors in feeding showing that when the images were printed through reciprocating motions in the order of steps Y (yellow)→M (magenta)→C (cyan)→O (overlay), printing stopped at the beginning or in the middle thereof, or a film was attached to the images in the order of final step O (overlay), and to compare their extents with each other. As a result thereof, the case in which no error in feeding existed was indicated by "○", the case in which an error in feeding occurred in one in three sheets of paper, or a problem occurred in the order of final step O was indicated by "Δ", and the serious case in which an error in feeding almost occurred was indicated by "X".

TABLE 5

| Division | Wrinkle/ Stain | Quality of Feeding | Magenta | Black | Remark |
| --- | --- | --- | --- | --- | --- |
| Example 1 | ○ | ○ | 1.77 | 1.85 | 3 sheets of paper on average |
| Example 2 | ○ | ○ | 1.78 | 1.83 | 3 sheets of paper on average |
| Example 3 | ○ | ○ | 1.75 | 1.83 | 3 sheets of paper on average |
| Comparative Example 1 | X | X | — | — | printing of one sheet of paper only in case of step Y (yellow) |
| Comparative Example 2 | ○ | ○ | 1.76 | 1.84 | 3 sheets of paper on average |
| Comparative Example 3 | ○ | ○ | 1.58 | 1.61 | 3 sheets of paper on average |
| Comparative Example 4 | Δ | Δ | 1.36 | 1.42 | 2 sheets of paper (printing failure in one sheet of paper at step 0) on average |

Based on the results presented in [Table 5] above, it could be confirmed that the problems of a "wrinkle or stain" and a "quality of feeding" occurred only in cases of Comparative Examples 1 and 4 among all the cases. In case of Comparative Example 1, since a total thickness of the recording medium was more than 400 μm, even though the printer was somewhat modified mechanically, feeding was not properly carried out because the thickness was too thick. Due to this, although one in three sheets of paper was yellow-printed by step Y, at that time it could also be found that wrinkles and stains largely occurred while the ink reception layer or the polyurethane base was pushed. In addition to a problem in the light of expenses, it was also regarded as not having been easy to cause the too thick recording medium to be matched mechanically. In case of Comparative Example 4, even though a value of "the thickness of the ink reception layer and/or the thickness of the base" was 0.17 greater than 0.15, the thickness of the ink reception layer was 10 μm less than 15 μm.

As stated previously, the introduction of polyurethane having good elasticity and flexibility had a large effect on the quality of feeding, and it could be found that the disadvantage of polyurethane was supplemented when the ink reception layer was thick (15 μm or more) to a degree. In case of Comparative Example 4, a problem was generated from the quality of feeding because the ink reception layer was not sufficiently thick, so the problem of occurrence in a wrinkle and/or a stain was also generated.

In case of Comparative Example 3, even though the thickness of the polyurethane was also 50 μm or more, and the thickness of the ink reception layer was also 15 μm or more, a value of the thickness of the ink reception layer and/or the thickness of the base was 0.125 less than 0.15.

Even though it was confirmed that there were no problems in the light of the "wrinkle and/or stain" and the "quality of feeding" because the thickness of the ink reception layer was 15 μm or more, in order to satisfy an optical density, the thickness of the ink reception layer also had to be thick in some degree according to each thickness of the polyurethane base.

Even though the optical density of magenta and black images were higher than those presented in Comparative Example 4 in which the ink reception layer is 10 μm thick, it could be confirmed that they reduced by ~about 10% in comparison with those presented in Examples.

However, when separating a sticker portion from the printed recording medium in order to attach the sticker to a nail or a toenail really after printing, it was somewhat inconvenient to separate it from the release paper because the polyurethane portion was too thin, and first and foremost, the polyurethane portion tended to be stretched easily, so the deformation of printed images occurred and it also was inconvenient to attach the sticker to a nail. This shows that polyurethane should have a thickness (50 μm or more) beyond a standard in consideration of the fact that the thickness of the polyurethane is intended for the sticker for a nail art.

TABLE 6

| | Example 1 | Example 2 | Example 3 | Comparative Example 1 | Comparative Example 2 | Comparative Example 3 | Comparative Example 4 |
|---|---|---|---|---|---|---|---|
| | | | | Division of Layer | | | |
| Usability | no problem | no problem | no problem | — | stretching | no problem | — |

Figure 4:
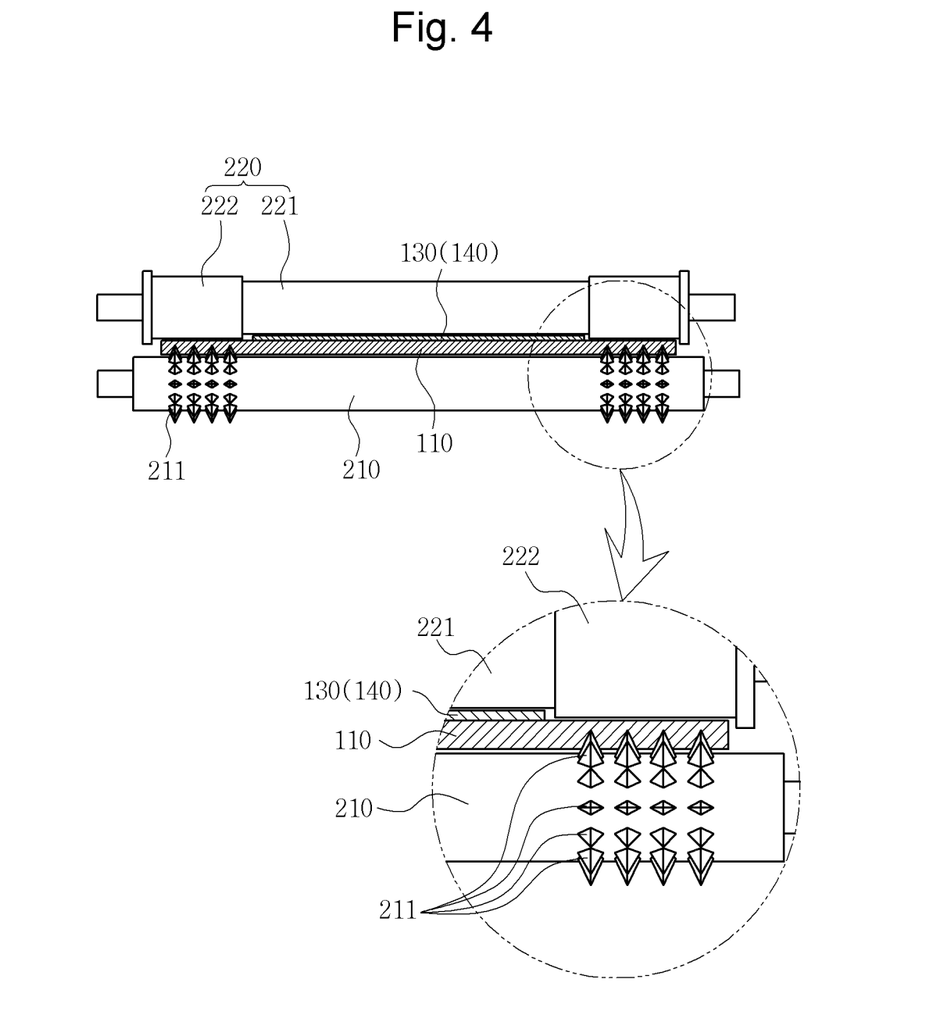
FIG. 4 represents a transfer state shown through the exemplary embodiment according to the present invention in a sublimation printer.

Referring to FIG. 3 and FIG. 4, it can be found that in the recording medium 100 according to the present invention, a transfer part 111, to which each of both surfaces of the release paper 110 is exposed by removal of the base 130, the ink reception layer 140, and so on, is formed at each of both ends of the release paper 110.

The release paper 110 is a constituent element to be transferred to an accurate pitch in such a manner that projections 211 of a feed roller 210 pass through the release paper.

That is, the base 130 is formed to have an area smaller than that of the release paper 110. Accordingly both sides of the release paper 110 are exposed so that the transfer parts 111 can be formed.

As explained previously, according to the printing method of the sublimation printer, during the process in which images are transferred to or coated on the recording medium in the order of steps Y (yellow)→M (magenta)→C (cyan)→O (overlay), the recording medium should be transferred through four or more reciprocating motions from the printer to back and forth. Accordingly, in the sublimation printer, a pressure roller 220 is provided at an upper portion and a feed roller 210 is provided at a lower portion centering around the recording medium located therebetween.

The feed roller 210 comprises a plurality of projections 211 that pass through the release paper 110, and the pressure roller 220 comprises a step part 222 that comes into close contact with the transfer part 111.

Since the base 130 of a polyurethane material does not exist in portions which the projections 211 pass through and are exposed to, the base 130 of the material having elasticity is not distorted by pressure occurring when the projections 211 pass through the release paper. In particular, since the step part 222 comes into close contact with the transfer part 111 and applies pressure thereto, the pressure has no effect on the base 130 located at an inner side of the step part 222, so the base 130 can be evenly maintained.

It is preferable that a width of the step part 222 is identical to or greater than that of the transfer part 111.

Figure 5:
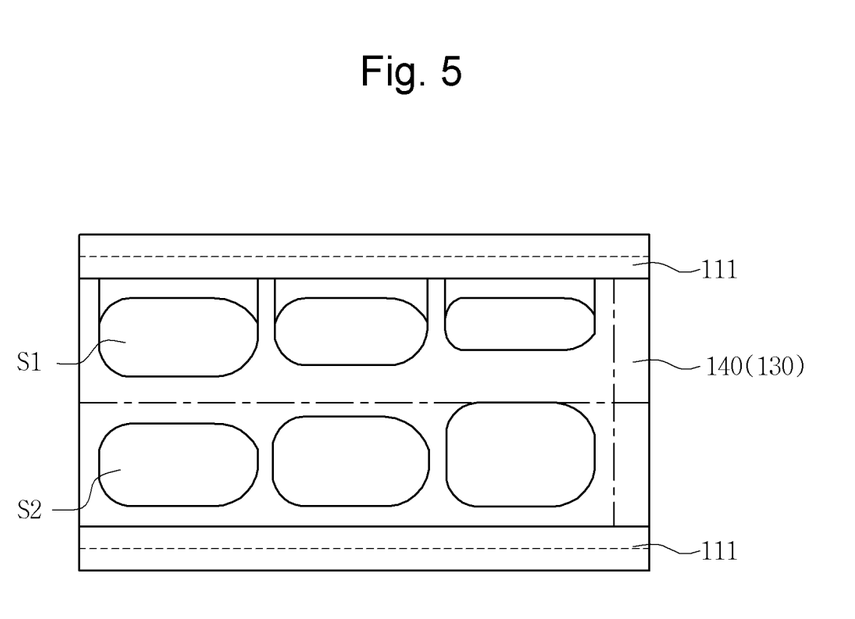
FIG. 5 represents that a sticker for a nail and a sticker for a toenail are formed.

Referring to FIG. 5, in the exemplary embodiment according to the present invention, a cutting line is formed at an upper portion of the release paper 110 so that a sticker for a nail S1 and a sticker for a toenail S2 can easily be separated from the release paper.

INDUSTRIAL APPLICABILITY

Since the base of the recording medium according to the present invention is composed of a material having elasticity, it can be attached to a nail or toenail formed in the shape of a curved surface to come into close contact therewith.

In particular, since it is possible to miniaturize the sublimation printer in a portable size, in the future it is expected that a nail sticker suitable to personal individuality and taste can be printed and then used for oneself using the recording medium according to the present invention.

What is claimed is:

1. A recording medium for a nail sticker, comprising:
a release paper;
an adhesion layer formed on the release paper;
a base of a polyurethane material attached to the adhesion layer; and
an ink reception layer formed on the base,
wherein a back coating layer is further formed on a back surface of the release paper,
wherein the back coating layer is formed of a polyurethane or acrylic material, and
wherein the back coating layer further comprises a pigment.

2. The recording medium of claim 1, wherein the ink reception layer has a thickness of 15 µm or more.

3. The recording medium of claim 1, wherein the base has a thickness of 50 µm or more.

4. The recording medium of claim 1, wherein an undercoating layer, which is intended for reinforcing a solvent resistance property when the ink reception layer is coated, is formed between the base and the ink reception layer.

5. The recording medium of claim 4, wherein the undercoating layer is formed of any one among polyester, an acrylic-based polymer, and polyurethane.

6. The recording medium of claim 1, wherein the back coating layer has a thickness of 2 to 3 µm.

7. The recording medium of claim 1, wherein the base is formed of a transparent polyurethane material, and a white layer is further formed between the adhesion layer and the base.

8. The recording medium of claim 7, wherein the white layer has a thickness of 5 µm or below.

9. A recording medium for a nail sticker, comprising:
a release paper;
an adhesion layer formed on the release paper;
a base of a polyurethane material attached to the adhesion layer; and
an ink reception layer formed on the base,
wherein a back coating layer is further formed on a back surface of the release paper,
wherein the back coating layer is formed of a polyurethane or acrylic material, and
wherein the base is formed of a transparent polyurethane material, and a white layer is further formed between the adhesion layer and the base.

10. The recording medium of claim 9, wherein the white layer has a thickness of 5 µm or below.

* * * * *